（12）United States Patent
Tian et al.

(10) Patent No.: US 7,826,743 B2
(45) Date of Patent: Nov. 2, 2010

(54) OPTICAL RING NETWORK FOR EXTENDED BROADCASTING

(75) Inventors: Cechan Tian, Plano, TX (US); Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 1678 days.

(21) Appl. No.: 10/996,707

(22) Filed: Nov. 22, 2004

(65) Prior Publication Data

US 2006/0110162 A1 May 25, 2006

(51) Int. Cl.
*H04B 10/00* (2006.01)
(52) U.S. Cl. .............................. 398/59; 398/66; 398/71
(58) Field of Classification Search ............. 398/58–73
See application file for complete search history.

(56) References Cited

U.S. PATENT DOCUMENTS

| | | | |
|---|---|---|---|
| 6,295,148 B1 | 9/2001 | Atlas | 398/9 |
| 6,321,001 B1 | 11/2001 | Heflinger | 385/24 |
| 6,400,859 B1* | 6/2002 | de Boer et al. | 385/24 |
| 6,407,839 B1 | 6/2002 | Cao | 398/9 |
| 6,415,070 B1 | 7/2002 | Munoz-Bustamante et al. | 385/24 |
| 6,466,343 B1 | 10/2002 | Lahat et al. | 398/82 |
| 6,512,618 B1 | 1/2003 | Heflinger | 385/37 |
| 6,529,299 B1 | 3/2003 | Munoz-Bustamante et al. | 398/58 |
| 6,577,422 B1 | 6/2003 | Frigo et al. | 398/49 |
| 6,606,430 B2 | 8/2003 | Bartur et al. | 385/24 |
| 6,607,312 B1* | 8/2003 | Woodward | 398/82 |

(Continued)

FOREIGN PATENT DOCUMENTS

WO 99/03231 1/1999

(Continued)

OTHER PUBLICATIONS

Extended European Search Report; EP05022112; pp. 9, Dec. 16, 2009.

(Continued)

*Primary Examiner*—Agustin Bello
(74) *Attorney, Agent, or Firm*—Baker Botts L.L.P.

(57) ABSTRACT

An optical network includes an access ring, a local ring, one or more add/drop nodes (ADNs), a first gateway and a second gateway. The access ring couples the plurality of gateways and transmits optical signals to and from the gateways, the optical signals comprising multiple wavelengths each wavelength operable to carry traffic. The local ring couples one or more of the ADNs and transmits optical signals to and from the ADNs. Additionally, the ADNs are capable of adding and dropping traffic to and from the local ring in one or more wavelengths.

The first gateway is capable of receiving broadcast traffic on the access ring, the broadcast traffic transmitted in one or more wavelengths of the optical signals transmitted on the access ring and forwarding, on the access ring, a first copy of the broadcast traffic received on the access ring. The first gateway is further capable of forwarding, to the local ring, a second copy of the broadcast traffic received on the access ring.

The second gateway is capable of receiving local traffic originating from one or more of the ADNs on the local ring and forwarding the local traffic to the access ring. The second gateway is further capable of receiving, from the local ring, broadcast traffic forwarded to the local ring by the first gateway and terminating the broadcast traffic received from the local ring.

24 Claims, 9 Drawing Sheets

U.S. PATENT DOCUMENTS

| | | | |
|---|---|---|---|
| 6,616,349 B1* | 9/2003 | Li et al. | 398/4 |
| 6,678,439 B2 | 1/2004 | Hoffmann et al. | 385/24 |
| 6,721,506 B1 | 4/2004 | Lam | 398/70 |
| 6,775,483 B1 | 8/2004 | Ikushima et al. | 398/186 |
| 6,895,184 B2* | 5/2005 | Way | 398/59 |
| 7,072,580 B2* | 7/2006 | Arecco et al. | 398/4 |
| 7,110,638 B2* | 9/2006 | Frankel | 385/24 |
| 7,120,359 B2* | 10/2006 | Way | 398/59 |
| 7,130,540 B2* | 10/2006 | Simmons et al. | 398/49 |
| 7,302,180 B2* | 11/2007 | Oren | 398/70 |
| 7,366,417 B2* | 4/2008 | Feuer et al. | 398/72 |
| 2002/0003639 A1* | 1/2002 | Arecco et al. | 359/119 |
| 2002/0048066 A1* | 4/2002 | Antoniades et al. | 359/128 |
| 2002/0131118 A1* | 9/2002 | Chiaroni et al. | 359/127 |
| 2002/0145782 A1 | 10/2002 | Strasser et al. | 359/127 |
| 2004/0141746 A1* | 7/2004 | Oberg | 398/59 |
| 2004/0165891 A1* | 8/2004 | Kopelovitz et al. | 398/83 |
| 2005/0158047 A1* | 7/2005 | Way et al. | 398/59 |
| 2006/0275035 A1* | 12/2006 | Way | 398/59 |

FOREIGN PATENT DOCUMENTS

| | | |
|---|---|---|
| WO | 99/66665 | 12/1999 |

OTHER PUBLICATIONS

Tzanakaki et al.; "Optical Add/Drop Multiplexers and Optical Cross-Connects for Wavelength Routed Networks"; Transparent Optical Networks, vol. 1; pp. 41-46, Jun. 29, 2003.

* cited by examiner

OPTICAL RING NETWORK FOR EXTENDED BROADCASTING

TECHNICAL FIELD OF THE INVENTION

The present invention relates generally to optical transport systems and, more particularly, to broadcasting signals across multiple optical rings.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels.

The topology in which WDM and DWDM networks are built plays a key role in determining the extent to which such networks are utilized. Ring topologies are common in today's networks. WDM add/drop units serve as network elements on the periphery of such optical rings. By using WDM add/drop equipment at each network element (node), the entire composite signal can be fully demultiplexed into its constituent channels and switched (added/dropped or passed through).

Additionally, the use of add/drop units within such optical networks makes it possible to broadcast traffic to multiple destinations with a single transmission. Nonetheless, a fault or other disruptive event on the optical network may result in all network elements downstream from the disruption not receiving the broadcast traffic. The likelihood of a fault disrupting traffic only increases when broadcast transmissions are propagated over multiple, interconnected optical networks, as variations in component quality and operating parameters inject significant uncertainty into transmissions. Thus, while broadcast transmissions provide an effective technique for communicating information to many destinations concurrently, these transmission may be more vulnerable to disruption.

SUMMARY

The present invention provides an optical ring network having components that support certain broadcasting techniques providing more reliable communication of optical signals throughout the network.

In accordance with a particular embodiment of the present invention, an optical network includes an access ring, a local ring, one or more add/drop nodes (ADNs), a first gateway and a second gateway. The access ring couples the plurality of gateways and transmits optical signals to and from the gateways, the optical signals comprising multiple wavelengths each wavelength operable to carry traffic. The local ring couples one or more of the ADNs and transmits optical signals to and from the ADNs. Additionally, the ADNs are capable of adding and dropping traffic to and from the local ring in one or more wavelengths.

The first gateway is capable of receiving broadcast traffic on the access ring, the broadcast traffic transmitted in one or more wavelengths of the optical signals transmitted on the access ring and forwarding, on the access ring, a first copy of the broadcast traffic received on the access ring. The first gateway is further capable of forwarding, to the local ring, a second copy of the broadcast traffic received on the access ring The second gateway is capable of receiving local traffic originating from one or more of the ADNs on the local ring and forwarding the local traffic to the access ring. The second gateway is further capable of receiving, from the local ring, broadcast traffic forwarded to the local ring by the first gateway and terminating the broadcast traffic received from the local ring.

Technical advantages of one or more embodiments of the present invention may include providing an improved optical ring network that supports certain techniques for broadcast transmissions. In particular embodiments, communication techniques supported by this network may provide greater reliability for information broadcast on the network. Another technical advantage of certain embodiments is shorter propagation times for networks spanning a substantial physical area.

It will be understood that the various embodiments of the present invention may include some, all, or none of the enumerated technical advantages. In addition, other technical advantages of the present invention may be readily apparent to one skilled in the art from the figures, description and claims included herein.

DETAILED DESCRIPTION

Figure 1A:
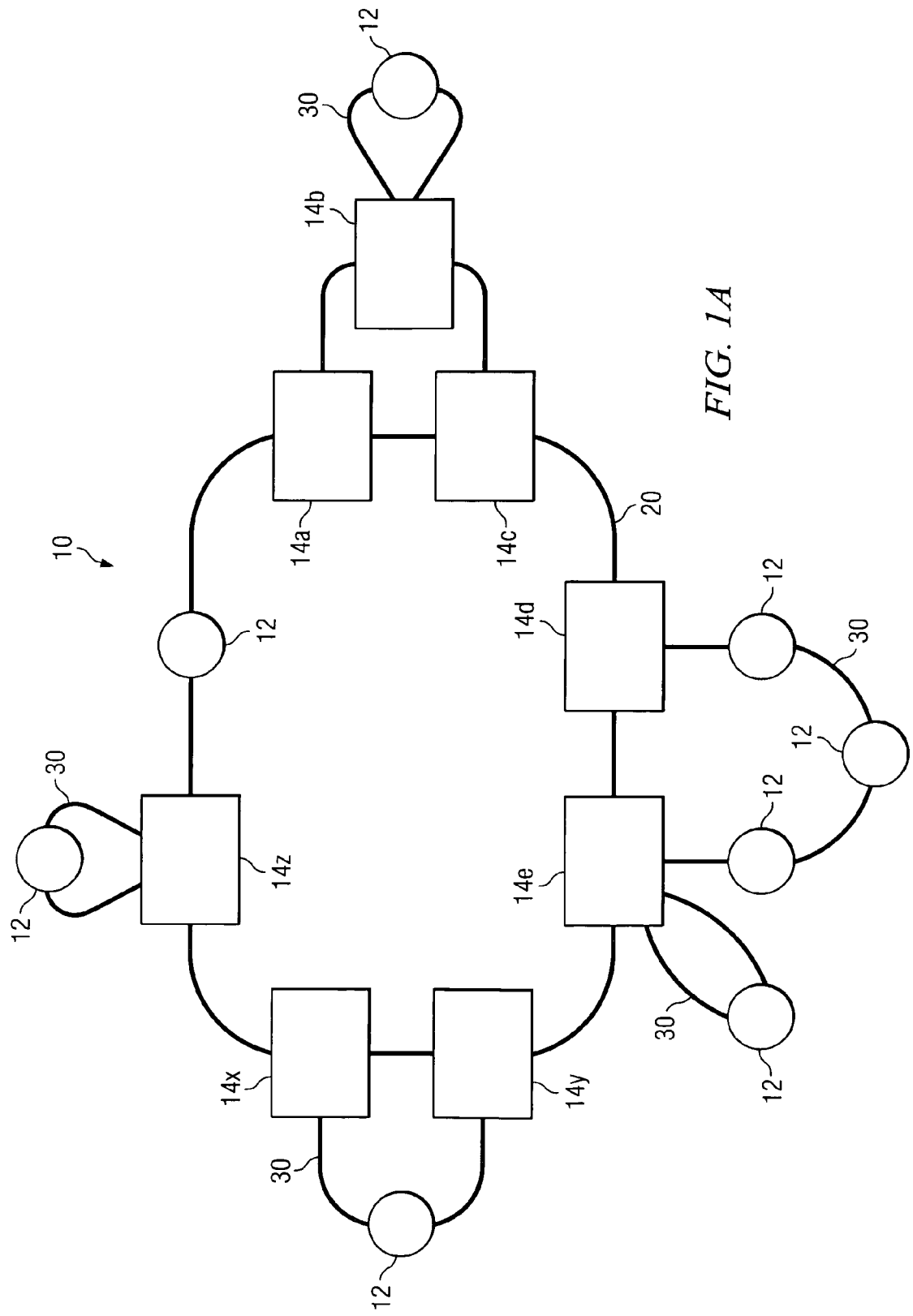
FIG. 1A is a block diagram illustrating an optical network in accordance with one embodiment of the present invention.

FIG. 1A illustrates an optical network 10 in accordance with one embodiment of the present invention. The example network 10 includes an access ring 20 and a plurality of local rings 30. Network 10 supports the communication of data to client devices coupled to access ring 20 and local rings 30. In a particular embodiment, local rings 30 may represent subtended networks of access ring 20. Network 10 also includes one or more gateways 14 capable of coupling on or more local rings 30 to access ring 20 or to other local rings 30. Network 10 also includes a plurality of add/drop nodes (ADNs) 12 located throughout network 10 that each facilitate communication between one or more client devices coupled to the ADNs. Gateways 14 may also support this functionality. Because certain embodiments of gateways 14 are configured to support extended broadcasting techniques for selected traffic, such gateways 14 may provide greater transmission efficiency as a single wavelength may be used to transmit broadcast traffic extensively throughout network 10. Additionally, particular embodiments of network 10 utilizing these broadcasting techniques may provide for more reliable communication of information across network 10.

Network 10 is an optical network in which a number of optical channels are carried over a common path in disparate wavelengths/channels. Network 10 may be a wavelength division multiplexing (WDM), dense wavelength division multiplexing (DWDM), or other suitable multi-channel network. Optical information signals may be transmitted as optical traffic on access ring 20 and local rings 30. As used herein, "traffic" may include any information transmitted, stored, or sorted in the network, including any request for services supported by a particular embodiment of network 10. This optical traffic has at least one characteristic modulated to encode audio, video, textual, real-time, non-real-time and/or other suitable data. Modulation may be based on phase shift keying (PSK), intensity modulation (IM), or other suitable methodologies. Additionally, traffic transmitted in optical network 10 may be structured in any appropriate manner including, but not limited to, being structures as frames, packets, or an unstructured bit stream.

Access ring 20 and local rings 30 include one or more fibers capable of transporting optical signals transmitted by components of network 10. Access rings 20 and local rings 30 may each include, as appropriate, a single, unidirectional fiber; a single, bi-directional fiber; or a plurality of uni- or bi-directional fibers. In the illustrated embodiment, both access ring 20 and local rings 30 represent a unidirectional fiber configured to transport traffic in a predetermined direction. Although this description focuses, for the sake of simplicity, on an embodiment of network 10 that supports unidirectional traffic, the present invention further contemplates a bi-directional system that includes appropriately modified embodiments of the components described below to support the transmission of traffic in opposite directions around rings 20 and 30. For example, access ring 20 and local rings 30 may each comprise a pair of unidirectional fibers, including a first fiber supporting transmission of traffic in a clockwise direction and a second fiber supporting transmission of traffic in a counterclockwise direction.

ADNs 12 are each operable to add and drop traffic to and from access ring 20 and local rings 30. In particular, each ADN 12 receives traffic from local clients and adds that traffic to access ring 20 or a particular local ring 30. At the same time, each ADN 12 receives traffic from access ring 20 or local rings 30 and drops traffic destined for the local clients. For the purposes of this description, ADNs 12 may "drop" traffic by transmitting a copy of the traffic to any appropriate components coupled to the ADNs 12 or gateway 14. As a result, each ADN 12 may drop traffic from access ring 20 or local ring 30 by transmitting the traffic to components coupled to that ADN 12 while allowing the traffic to continue to downstream components on access ring 20 or local ring 30. Moreover, as used throughout this description and the following claims, the term "each" means every one of at least a subset of the identified items. In adding and dropping traffic, the ADNs 12 may combine data from clients for transmittal in access ring 20 and local rings 30 and may drop channels of data from access ring 20 and local rings 30 for clients. Traffic may be dropped by making the traffic available for transmission to the local clients. The contents of a particular embodiment of ADN 12 is described in greater detail below with respect to FIG. 5.

Gateways 14 facilitate the routing of appropriate traffic to and from local rings 30. In particular, gateways 14 are operable to forward certain traffic to local rings 30 from access ring 20 or other local rings 30 and to add certain traffic from local rings 30 to access ring 20 or other local rings 30. Furthermore, gateways 14 may forward traffic from access ring 20 to local rings 30 indiscriminately, or may be configured to only pass certain traffic through to local rings 30 based on the wavelength, the destination, or any other appropriate characteristics of the selected traffic. Similarly, gateways 14 may add traffic from local rings 30 to access ring 20 indiscriminately, or may be configured to only pass certain traffic though to access ring 20 based on the wavelength, the destination, or any other appropriate characteristics of the selected traffic. For example, in a particular embodiment, certain traffic is designated as broadcast traffic and appropriate gateways 14 forward such broadcast traffic to local rings 30 while appropriate gateways 14 terminate broadcast traffic as this traffic exits a local ring 30.

Figure 2A:
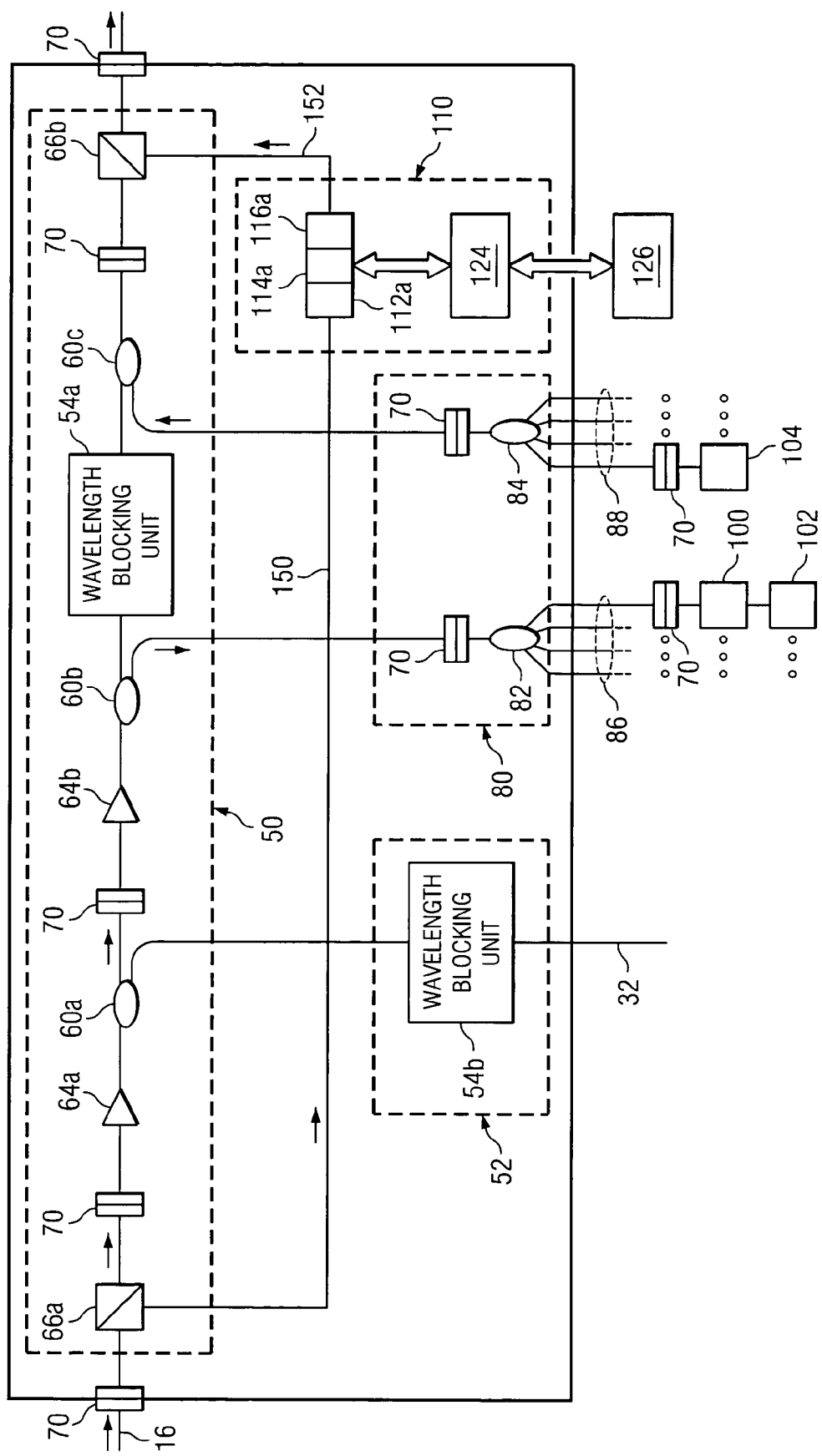
FIG. 2A is a block diagram illustrating details of a gateway that may be used in the network of FIGS. 1A and 1B, in accordance with one embodiment of the present invention.
Figure 3:
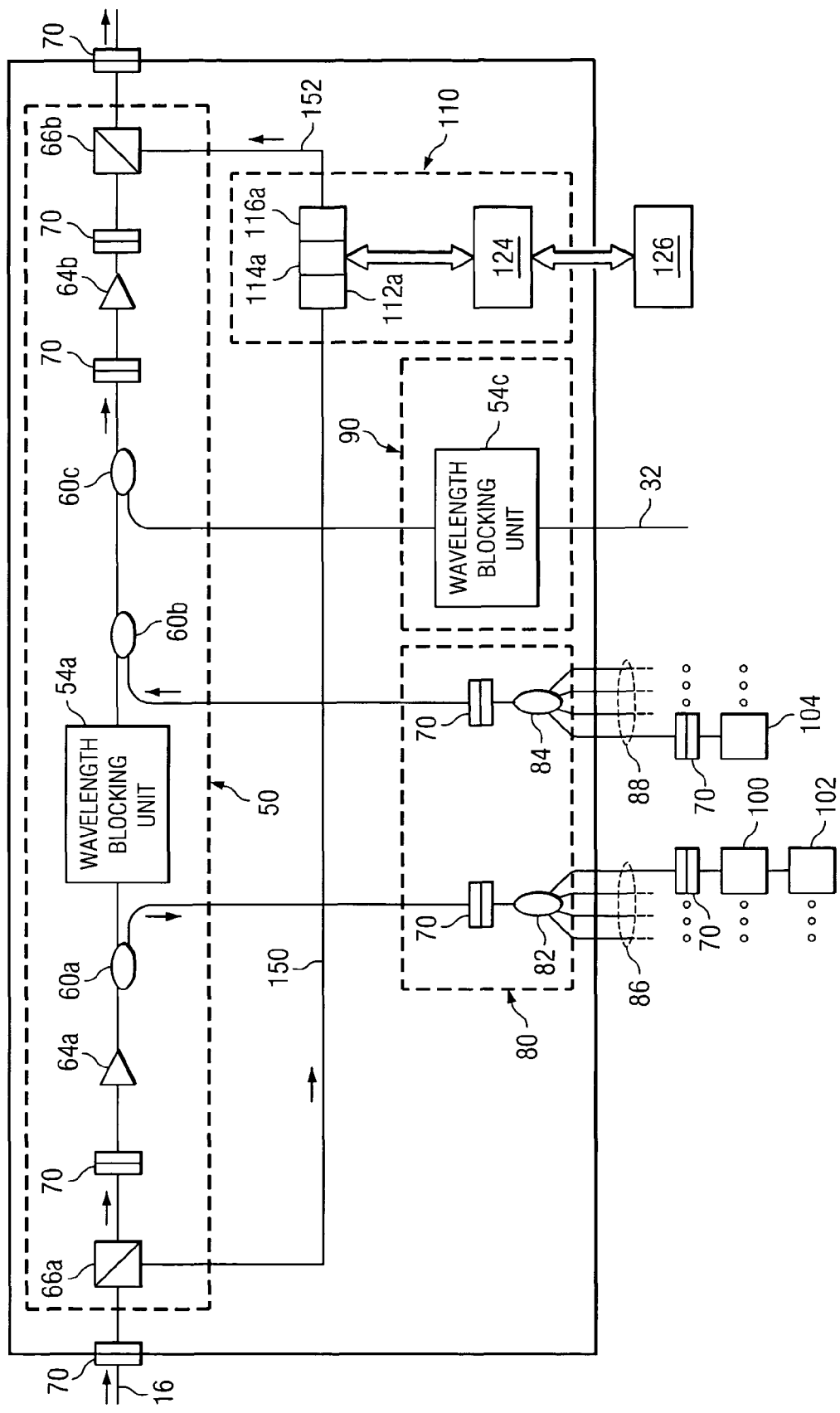
FIG. 3 is a block diagram illustrating an alternative embodiment of a gateway that may be used in the network of FIGS. 1A and 1B, in accordance with one embodiment of the present invention.
Figure 6:
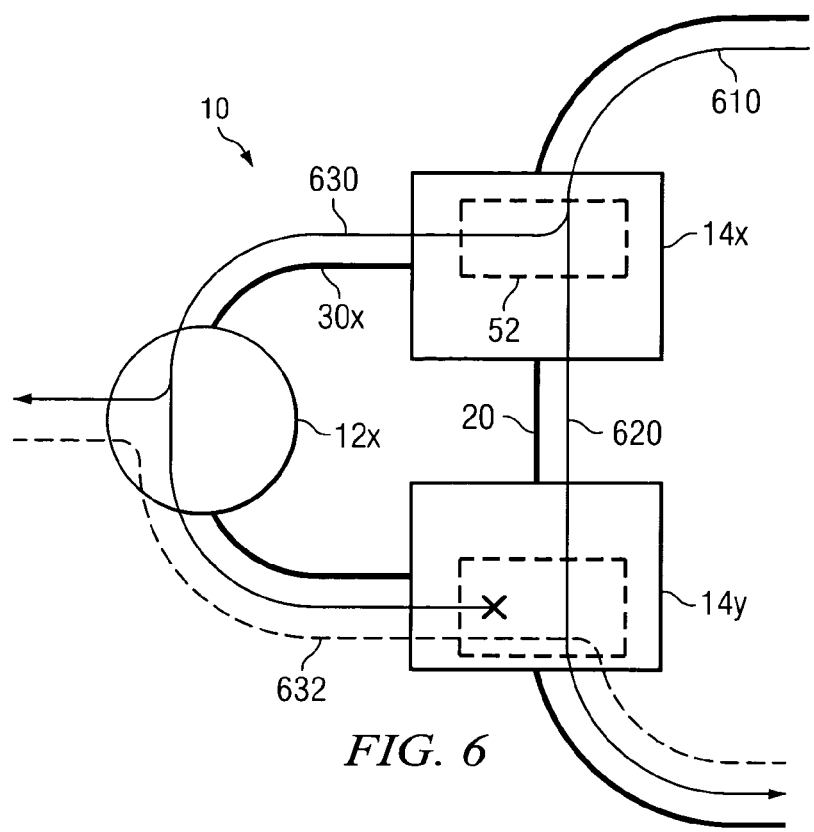
FIG. 6 illustrates an example operation of a particular embodiment of the gateways of FIGS. 2A and 3.

Depending on the configuration of a particular local ring 30, a first gateway 14 may be configured to forward traffic from access ring 20 to that local ring 30, while another gateway 14 may be configured to add traffic from that local ring 30 to access ring 20. For example, gateway 14x of FIG. 1A is configured to forward appropriate traffic to local ring 30x, while gateway 14y is configured to add appropriate traffic from local ring 30x to access ring 20. FIGS. 2A and 3 illustrate the contents of particular embodiments of such gateways 14 in greater detail, while FIG. 6 illustrates their operation.

Figure 4:
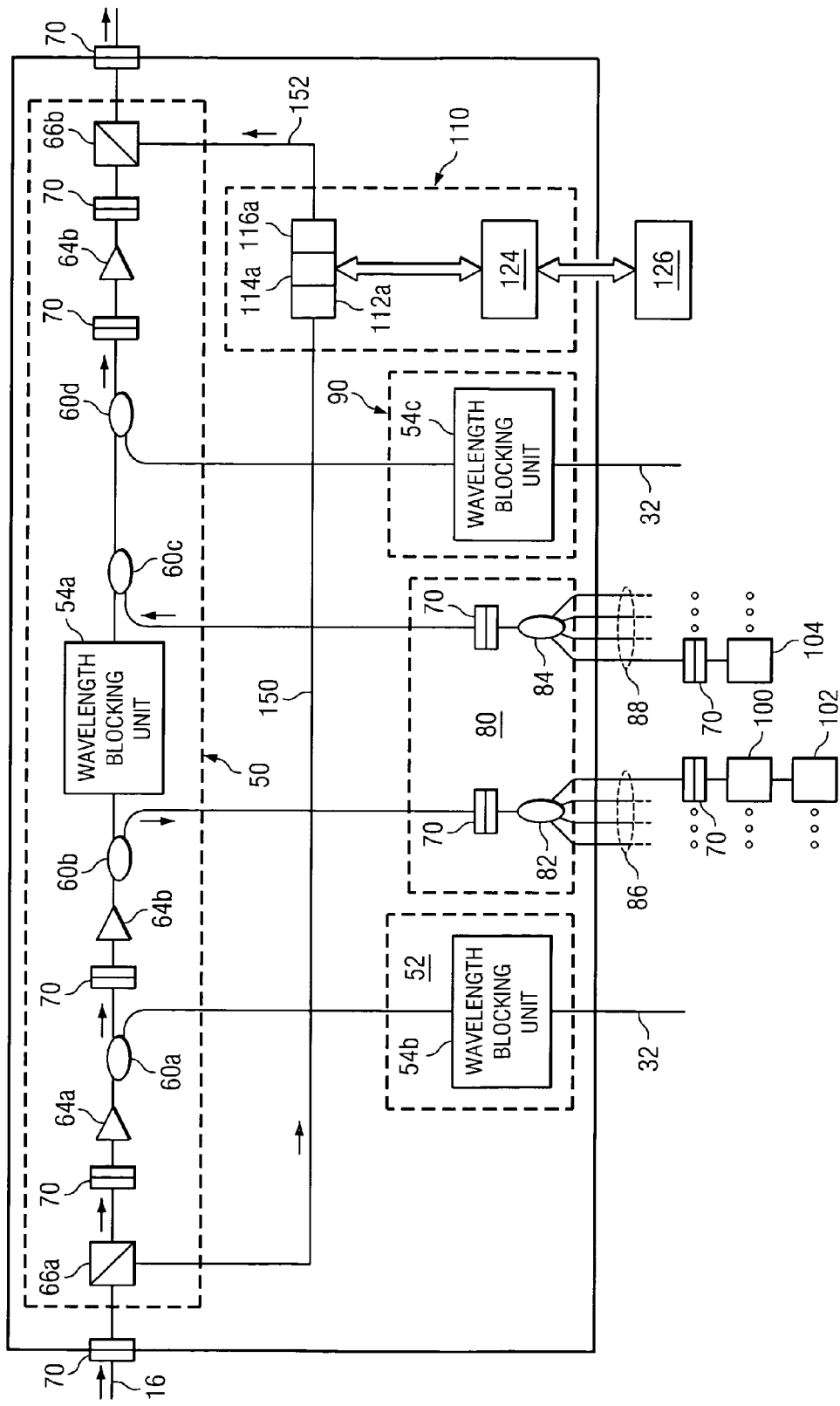
FIG. 4 is a block diagram illustrating another alternative embodiment of a gateway that may be used in the network of FIGS. 1A and 1B, in accordance with one embodiment of the present invention.
Figure 7:
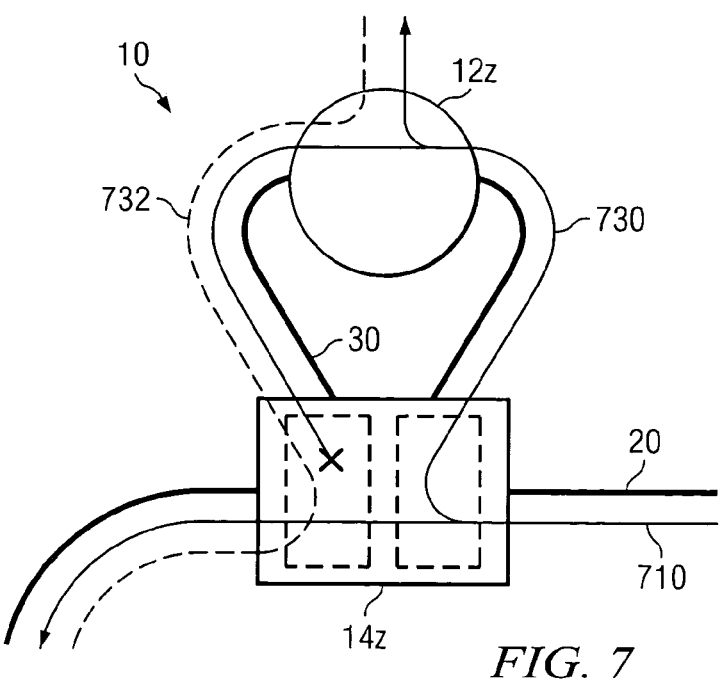
FIG. 7 illustrates an example operation of a particular embodiment of the gateway of FIG. 4.

By contrast, for alternative configurations of local rings 30, a single gateway 14 may both forward traffic of a particular direction to that local ring 30 and also add traffic of the same direction from that local ring 30 to access ring 20. For example, gateway 14z of FIG. 1A both forwards traffic from access ring 20 to local ring 30z and adds traffic from local ring 30z to access ring 20. FIG. 4 illustrates the contents of a particular embodiment of such a gateway 14 in greater detail, while FIG. 7 illustrates its operation.

Furthermore, in addition to adding and forwarding traffic to and from local rings 30, gateways 14 may be configured to add and drop traffic for local clients coupled to gateways 14. Gateways 14 may combine data from local clients for transmittal on access ring 20 and may drop channels of data from access ring 20 to local clients. Gateways 14 may drop traffic by making the traffic available for transmission to the local clients. As with ADNs 12, a particular gateway 14 may "drop" traffic by transmitting a copy of the traffic to any appropriate components coupled to that gateway 14. As a result, a particular gateway 14 may drop traffic from access ring 20 by transmitting the traffic to components coupled to that gateway 14 while allowing the traffic to continue to downstream components on access ring 20. Thus, as with ADNs 12, gateways 14 may drop traffic but yet allow the traffic to continue to circulate on access ring 20.

In operation, access ring 20 and local rings 30 transport traffic transmitted by client devices and other components on network 10. As traffic on access ring 20 traverses a gateway 14, gateway 14 may forward the traffic to a local ring 30 coupled to that gateway 14. Gateway 14 may forward all traffic on access ring 20 to the coupled local ring 30. Alternatively, in a particular embodiment, a subset of the traffic transmitted on network 10 is designated as "broadcast" traffic intended for transmission to a plurality of ADNs 12 on network 10.

In particular, gateway 14 splits traffic designated for transmission to local rings 30 into two copies. Gateway 14 forwards one copy of the traffic to the next downstream component on access ring 20 and forwards the other copy to the next downstream component on one or more local rings 30 coupled to gateway 14. FIGS. 6 and 7 illustrate in greater detail the operation of particular embodiments of gateways 14 in transferring traffic to local rings 14.

As a result of the manner in which gateway 14 forwards traffic to local rings 30, network 10 may provide techniques for transmitting certain types of traffic throughout network 10 that provide greater operational reliability in network 10. In particular, because gateways 14 copy traffic on access ring 20 and forward copies of this traffic to both access ring 20 and local rings 30, breaks or other faults in a particular local ring 30 may not disrupt the transmission of this traffic on access ring 20 and/or to other local rings 30. Consequently, particular embodiments of network 10 may provide for more reliable communication of information across network 10, particularly where the information is being broadcast to multiple local rings 30. Furthermore, because traffic arriving at a gateway 14 associated with a particular local ring 30 does not need to traverse that local ring 30 before advancing to the next gateway 14 or other downstream component, particular embodiments of network 10 may be able to communicate information throughout a particular network 10 more quickly.

Figure 1B:
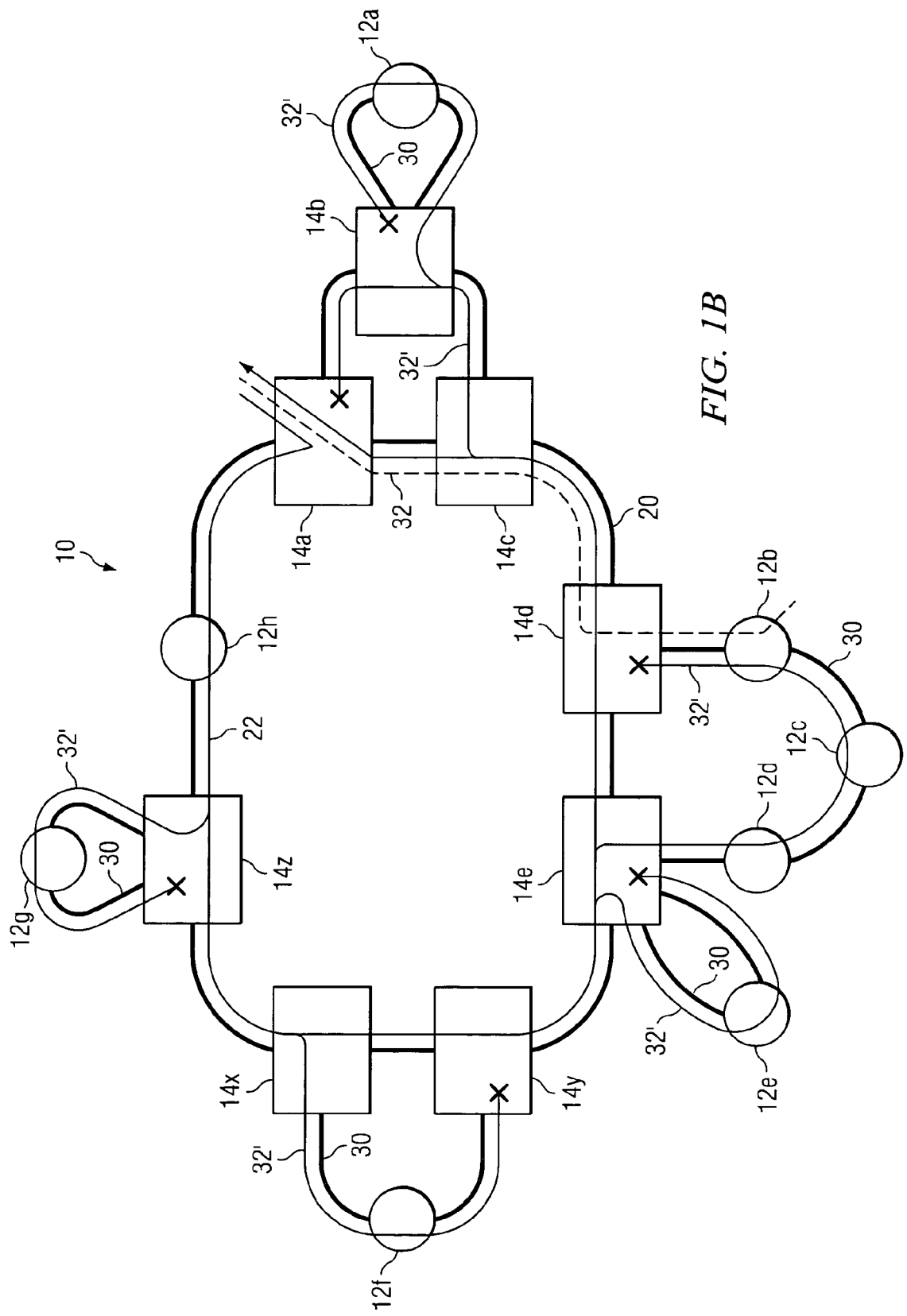
FIG. 1B is a block diagram illustrating the propagation of broadcast and local traffic in the optical network of FIG. 1A according to a particular embodiment of the present invention.

FIG. 1B illustrates the transmission of a broadcast traffic stream 22 throughout network 10 according to a particular embodiment of the present invention. As noted above, broadcast traffic stream 22 may represent some or all of the traffic transmitted on access ring 20. FIG. 1B additionally shows the transmission of traffic (local traffic 32) added by ADNs 12 coupled to local rings 30. As shown in FIG. 1B, upon receiving broadcast traffic stream 22, a particular gateway 14 forwards broadcast traffic stream 22 to one end of a particular local ring 30 and the same gateway 14 or another gateway 14 will terminate broadcast traffic stream 22 once broadcast traffic stream 22 reaches the opposite end of that particular local ring 30. By terminating broadcast traffic stream 22 at the other end of local ring 30, the relevant gateway 14 may prevent interference with broadcast traffic or other traffic already propagating on access ring 20. Meanwhile, gateways 14 may add local traffic collected on their associated local ring 30 to the traffic already propagating on access ring 20 to allow this traffic to be transmitted elsewhere on access ring 20 or to other local rings 30.

More specifically, as shown in the example of FIG. 1B, broadcast traffic stream 22 is transmitted on access ring 20, starting at gateway 14a. Broadcast traffic stream 22 may be generated by gateway 14a or may be forwarded by gateway 14a from an external network, sub-network of network, or any appropriate component coupled to gateway 14. After being transmitted, broadcast traffic stream 22 propagates around access ring 20 as shown.

When broadcast traffic stream 22 reaches a gateway 14, that gateway 14 splits broadcast traffic stream 22 to form two copies of broadcast traffic stream 22. Gateway 14 then forwards one copy (broadcast traffic stream 22) to the next downstream component on access ring 20 and forwards one copy (broadcast traffic stream 22') to a component, such as an ADN 12, through a particular local ring 30 coupled to gateway 14. Once broadcast traffic stream 22' has propagated over the length of the relevant local ring 30, a gateway 14 at the opposite end of that local ring 30 terminates broadcast traffic stream 22'.

Additionally, an ADN 12 coupled to local ring 30 may transmit local traffic stream 32 generated by client devices coupled to that ADN 12 or generated by ADN 12 based on information received from these client devices on local ring 30. For example, FIG. 1B illustrates local traffic stream 32 transmitted by ADN 12b on local ring 30c. Local traffic stream 32 propagates over the length of the local ring 30 on which local traffic stream 32 was transmitted, or local ring 30c in FIG. 1B. Unlike broadcast traffic stream 22, however, local traffic stream 32 is not terminated when local traffic stream 32 reaches the gateway 14 coupled to the terminal end of local ring 30, here gateway 14d, after propagating over the length of local ring 30. Instead, the relevant gateway 14 adds local traffic stream 32 to other traffic propagating on access ring 30. Although FIG. 1B illustrates local traffic stream 32 exiting access ring 20 at gateway 14a, local traffic stream 32 may instead be propagated further down stream to other gateways 14 or terminated as appropriate depending on the destination for local traffic stream 32 and the configuration of network 10.

FIG. 2A is a block diagram illustrating details of a gateway 14 in accordance with one embodiment of the present invention. In particular, FIG. 2A illustrates contents of a particular type of gateway 14, such as gateway 14x of FIG. 1, capable of forwarding traffic on access ring 20 to one or more local rings 30. Referring to FIG. 2A, gateway 14 comprises one or more transport elements 50, a broadcast unit 52, and a managing element 110. Additionally, particular embodiments of gateway 14, such as the one illustrated in FIG. 2A, are configured to facilitate direct communication between client devices and access ring 20 and may include a distributing/combining element 80 and a wavelength blocking unit (WBU) 54a to support such operation.

As shown in FIG. 1A, gateway 14x is connected to an ingress end of one or more local rings 30, while another gateway 14, specifically gateway 14y, is connected to an egress end of one or more of those local rings 30. Thus, traffic broadcast to a particular local ring 30 by gateway 14x will be received by gateway 14y once that traffic traverses local ring 30. Moreover, although FIG. 2A illustrates a particular embodiment of gateway 14 that is configured only to forward broadcast traffic to local ring 30, but not to receive broadcast traffic after the broadcast traffic has traversed local ring 30, a particular embodiment of gateway 14 may include components for both forwarding and receiving broadcast traffic but be configured to perform only one of these tasks. Thus, a particular embodiment of gateway 14 similar to that illustrated in FIG. 4 may be configured to operate as described with respect to the embodiment of gateway 14 illustrated by FIG. 2A. Conversely, under certain circumstances, gateways 14 configured similar to that shown in FIG. 2A may be modified with the addition of appropriate components to operate as described with respect to the embodiment of gateway 14 illustrated by FIG. 4.

In one embodiment, the elements 50, 80, and 110, as well as components within the elements may be interconnected with optical fiber links. In other embodiments, the components may be implemented in part or otherwise with planar waveguide circuits and/or free space optics. Any other suitable connections may alternatively be used. In addition, the elements of gateway 14 may each be implemented as one or more discrete cards within a card shelf of the gateway 14. Exemplary connectors 70 for a card-shelf embodiment are illustrated in FIG. 2A but any suitable connectors 70 may be used in such a card-shelf embodiments. The connectors 70 may allow efficient and cost effective replacement of failed components. It will be understood that additional, different, and/or other connectors may be provided as part of the gateway 14.

Transport element 50 is positioned "in-line" on a fiber of access ring 20 and particular local rings 30, as appropriate. Transport element 50 may be used to generate one or more copies of traffic propagating for forwarding on access ring 20 to one or more local rings 30. Additionally, transport element 50 may include components appropriate to facilitate communication of particular traffic between client devices of gateway 14 and access ring 20 or any other suitable ring to which gateway 14 is coupled. Furthermore, although gateway 14 as illustrated includes only a single transport element 50, particular embodiments of gateway 14 may be configured to receive and transmit traffic on access ring 20 and/or local rings 30 in more than one direction and may include additional transport elements 50 to facilitate such operation. For example, in a particular embodiment of network 10, traffic may propagate around access ring 20 in two directions with traffic on a first fiber traveling in a clockwise direction and traffic on a second fiber traveling in a counterclockwise direction. In such an embodiment, gateway 14 may include two transport elements 50, one coupled to the first fiber for receiving and transmitting clockwise traffic and one coupled to the second fiber for receiving and transmitting counterclockwise traffic.

Transport element 50 may comprise either a single add/drop coupler 60 or a plurality of add/drop couplers 60 which allow for the passive forwarding and adding of traffic. In the illustrated embodiment, transport element 50 includes a first add/drop coupler 60a to create a copy of the received traffic to enable the forwarding of one or more channels of the received traffic to one or more local rings 30 and a second add/drop 60b to facilitate communication between client devices of gateway 14 and access ring 20. Furthermore, in a particular embodiment, transport unit 50 may include additional couplers so that if any of these couplers fails, the additional coupler can still provide add or forward functionality. Although the described embodiment utilizes couplers 60, any other suitable optical splitters may be used. For the purposes of this description and the following claims, the terms "coupler," "splitter," and "combiner" should each be understood to include any device which receives one or more input optical signals, and either splits or combines the input optical signal (s) into one or more output optical signals.

Transport element 50 further comprises OSC filters 66 at the ingress and egress edges of each element that, respectively, remove the OSC channel from and add the OSC channel to the traffic in transport element 50. OSC filters 66 may comprise thin film type, fiber grating or other suitable type filters. Transport element 50 also includes amplifiers 64 positioned between the ingress OSC filter 66a and the egress OSC filter 66b. Amplifiers 64 may comprise a erbium-doped fiber amplifiers (EDFA) or other suitable amplifiers.

Broadcast unit 52 determines what portion of traffic received by gateway 14 is broadcast traffic and forwards that portion to one or more local rings 30 coupled to gateway 14.

In particular embodiments, particular wavelengths are designated, statically or dynamically, for broadcast traffic. In such embodiments, broadcast unit 52 may include a WBU 54b that receives a copy traffic from access ring 20 from coupler 60a. WBU 54b terminates the transmission of traffic propagated at certain receiving wavelengths while passing to local ring 30 traffic on wavelengths designated for broadcast traffic. WBU 54b may additionally terminate wavelengths designated for transmission by ADNs 12 to allow ADNs 12 on local ring 30 to add traffic to access ring 20 without interference from traffic previously added by ADNs 12 on that local ring 30 or by other ADNs 12 that also transmit on the relevant transmitting wavelengths.

Figure 2B:
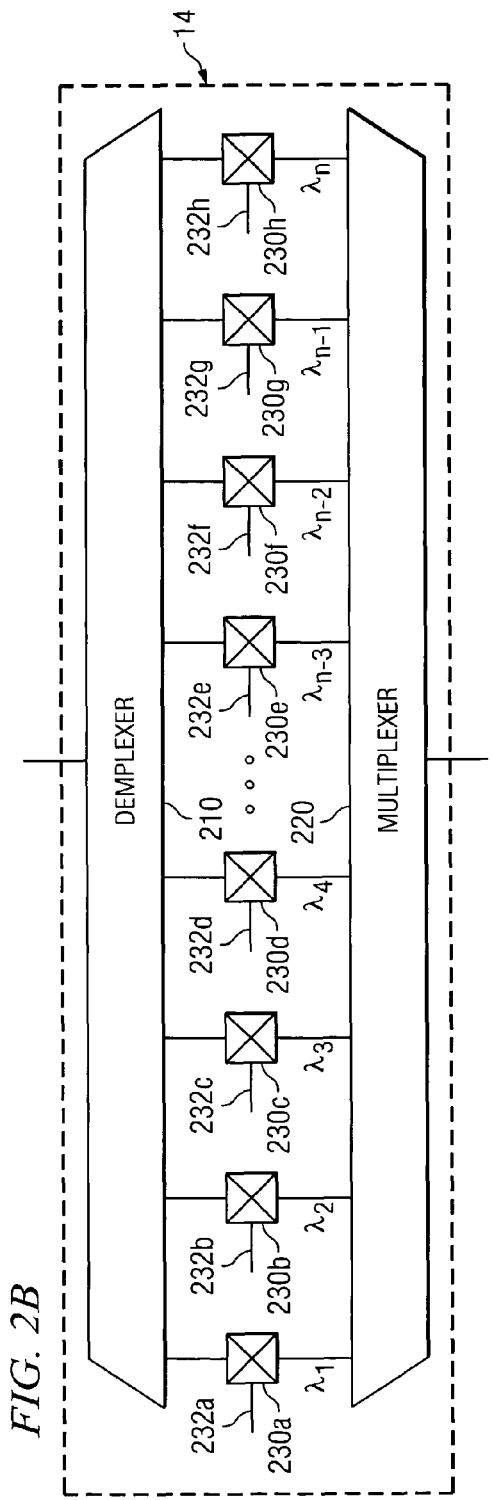
FIG. 2B is a block diagram illustrating details of a wavelength blocking unit that may be used in a particular embodiment of the gateway of FIG. 2A.
Figure 2C:
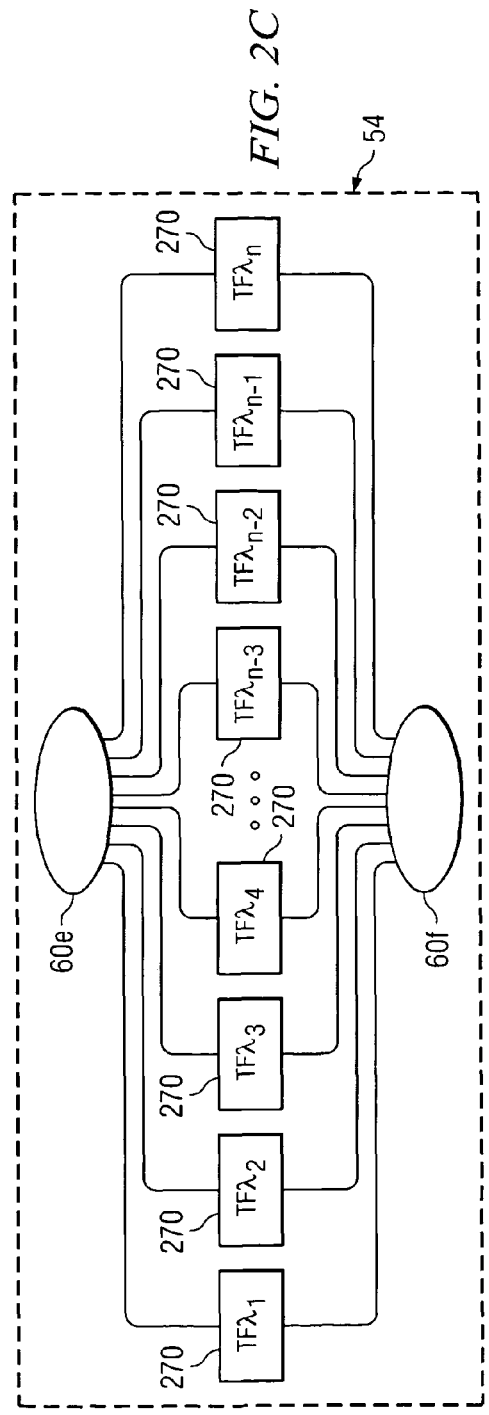
FIG. 2C is a block diagram illustrating details of an alternative embodiment of a wavelength blocking unit that may be used in a particular embodiment of the gateway of FIG. 2A.

Although shown as a functional block in FIG. 2A, and again in FIGS. 3 and 4, WBU 54 may represent and/or include any components configured in any appropriate manner to provide the functionality of dynamically blocking certain wavelengths and passing other wavelengths. As one example, WBU 54 may represent a structure that includes an optical demultiplexer and an optical multiplexer connected by a series of switches. An example of such a structure is shown in FIG. 2B and is described in further detail below. As another example, WBU 54 may represent a collection of tunable filters selected to allow only traffic on appropriate wavelengths to be forwarded onto local ring 30. An example of such a structure is shown in FIG. 2C and is described in further detail below. As yet another example, WBU 54 may represent a wavelength-selective switch.

Distributing/combining element 80 facilitates the adding and dropping of traffic to and from client devices coupled to gateway 14. Distributing/combining element 80 may comprise a drop signal splitter 82 and an add signal combiner 84. Splitter 82 may comprise a coupler with one optical fiber ingress lead and a plurality of optical fiber egress leads which serve as drop leads 86. Drop leads 86 may be connected to one or more filters 100 which in turn may be connected to one or more drop optical receivers 102 which communicate traffic to the local clients. In particular embodiments in which four drop leads 86 are implemented, splitter 82 may comprise a 2×4 optical coupler, where one ingress lead is terminated, the other ingress lead is coupled to a coupler 60 via a fiber segment, and the four egress leads are used as the drop leads 86. Although the illustrated embodiment shows four drop leads 86, it should be understood that any appropriate number of drop leads 86 may implemented, as described in further detail below.

Additionally, although FIG. 2A illustrates an embodiment of gateway 14 that includes separate broadcast unit 52 and distributing/combining element 80, gateway 14 may instead be configured so that receivers 102 associated with local clients are coupled to components of broadcast unit 52, and broadcast unit 52 may forward traffic to these receivers 102 as appropriate. For example, in a particular embodiment WBU 54b may represent a wavelength-selective switch. In such an embodiment, an output port of the wavelength selective switch may be coupled to local ring 30 while one or more other ports may be coupled to receivers 102 associated with local clients. The wavelength-selective switch may be able to switch traffic between local ring 30 and the local clients as appropriate.

As described above with respect to broadcast unit 52, WBU 54a terminates optical signals propagating at particular wavelengths on access ring 20. More specifically, WBU 54a terminates particular wavelengths of traffic on access ring 20 to prevent traffic from circling access ring 20 indefinitely and potentially interfering with subsequently transmitted traffic. Depending on the configuration of network 10, all, some, or none of gateways 14 may include WBU 54a. Additionally, the wavelengths terminated by a particular WBU 54a may be predetermined and fixed or may be dynamically configured.

Combiners 84 similarly may comprise a coupler with multiple optical fiber ingress leads, which serve as add leads 88, and one optical fiber egress lead. The add leads 88 may be connected to one or more add optical transmitters 104 which receive traffic from the local clients. In particular embodiments in which four add leads 88 are implemented, combiner 84 may comprise a 2×4 optical coupler, where one ingress lead is terminated, the other ingress lead is coupled to a coupler via a fiber segment, and the four egress leads are used as the add leads 88. Although the illustrated embodiment shows four add leads 88, it should be understood that any appropriate number of add leads 88 may implemented, as described in further detail below.

Managing element 110 may comprise OSC receivers 112, OSC interfaces 114, OSC transmitters 116, and an element management system (EMS) 124. gateway 14 also comprises OSC fiber segments 150 and 152 that connect managing element 110 to ingress and egress OSC filters 66. Each OSC receiver 112, OSC interface 114, and OSC transmitter 116 set forms an OSC unit for access ring 20 and/or local ring 30 in the gateway 14. The OSC units receive and transmit OSC signals for the EMS 124. The EMS 124 may be communicably coupled to a network management system (NMS) 126. NMS 126 may reside within gateway 14, in a different node, or external to all of the gateways 14.

EMS 124 and/or NMS 126 may comprise logic encoded in media for performing network and/or node monitoring, failure detection, protection switching and loop back or localized testing functionality of the network 10. Logic may comprise software encoded in a disk or other computer-readable medium and/or instructions encoded in an application-specific integrated circuit (ASIC), field programmable gate array (FPGA), or other processor or hardware. It will be understood that functionality of EMS 124 and/or NMS 126 may be performed by other components of the network and/or be otherwise distributed or centralized. For example, operation of NMS 126 may be distributed to the EMS 124 of ADNs 12 and/or gateways 14, and the NMS 126 may thus be omitted as a separate, discrete element. Similarly, the OSC units may communicate directly with NMS 126 and EMS 124 omitted.

In operation, transport element 50 receives traffic from access ring 20 or, if appropriate, from a local ring 30. Transport element 50 is operable to passively forward traffic from access ring 20 to one or more local rings 30 through broadcast unit 52. Transport element 50 is also operable to passively add traffic from local clients to access ring 20 and to drop traffic for local clients from access ring 20 through distributing/combining element 80. Additionally, transport element 50 may further be operable to passively add and forward the OSC signal to and from access ring 20.

More specifically, OSC ingress filter 66a processes an ingress optical signal from access ring 20. OSC filter 66a filters the OSC signal from the optical signal and forwards the OSC signal to OSC receiver 112. OSC filter 66a also forwards the remaining transport optical signal or allows the remaining transport optical signal to pass to amplifier 64a. Amplifier 64a amplifies the signal and forwards the signal to coupler 60a. Coupler 60a passively splits the signal from amplifier 64a into two generally identical signals: a through signal that is forwarded to amplifier 64b, and a forward signal that is forwarded to broadcast unit 52. Broadcast unit 52 allows broadcast traffic included in the forward signal to pass through broadcast unit 52 and terminates all or a portion of the remaining traffic included in the forward signal. Depending on the configuration of network 10, the traffic propagating on access ring 20 may also include non-broadcast traffic destined for client devices coupled to local ring 30. Broadcast unit 52 may also be configured to allow this non-broadcast traffic to pass through broadcast unit 52. In the illustrated embodiment, broadcast unit 52 includes WBU 54 which blocks all traffic not propagating on any of the one or more wavelengths associated with broadcast traffic. Broadcast unit 52 forwards the broadcast traffic portion of the forward signal one or more local rings 30 coupled to gateway 14.

Meanwhile, coupler 60b passively splits the through signal from amplifier 64b into two generally identical signals: a second through signal that is forwarded to WBU 54b and a drop signal that is forwarded to distributing/combining element 80. WBU 54b terminates particular wavelengths of the second through signal and forwards the resulting signal to coupler 60c. As noted above, a particular embodiment of gateway 14 may not include WBU 54b and coupler 60c may connect directly to coupler 60b. Moreover, in a particular embodiment of gateway 14 that lacks WBU 54b, coupler 60c and coupler 60b may be replaced by a single coupler to both drop traffic to distributing/combining element 80 from access ring 20 and to add traffic from distributing/combining element to access ring 20.

Coupler 60c passively combines the second through signal with an add signal comprising add traffic from distributing/combining element 80. The combined signal is forwarded from coupler 60c to OSC egress filter 66b. OSC egress filter 66b adds an OSC signal from OSC transmitter 116 to the combined optical signal and forwards the new combined signal as an egress transport signal to ring 16 of network 10. The added OSC signal may be locally generated data or may be received OSC data forwarded through by the EMS 124.

Prior to being forwarded to couplers 60, locally-derived add traffic (from local clients or subscribers, from another network, or from any other appropriate source) is received at a distributing/combining element 80 from one or more of the optical transmitters 104. One or more of the optical transmitters 104 may include one or more components for adjusting the optical output power from the transmitter 104, such as a manual variable optical attenuator. Traffic to be added to ring 16 is received at distributing/combining element 80. A separate optical transmitter 104 may be used for each wavelength/channel in which traffic is to be added at a gateway 14. Furthermore, each add lead 88 may be associated with a different wavelength/channel. Therefore, there may be a transmitter 104 and add lead 88 combination for each separate channel in which traffic is desired to be added at a particular gateway 14. Although four add leads 88 are illustrated (although four transmitters 104 are not explicitly illustrated), it will be understood that any appropriate number of optical transmitters 104 and associated add leads 88 may be used. Although FIG. 2A illustrates a particular embodiment of distributing/combining element 80 that includes a particular configuration of combiner 84 and add leads 88, in alternative embodiments of gateway 14 any or all of these components may be replaced by a suitable embodiment of WBU 54, including either of the embodiments illustrated by FIG. 2B or FIG. 2C.

Add traffic from one or more transmitters 104 associated with a particular distributing/combining element 80 is received at combiner 84. Combiner 84 combines the signals from multiple transmitters 104 (if applicable) and forwards the combined add signal to coupler 60 for addition to access ring 20. As described above, this add traffic is then combined with forwarded traffic at coupler 60. Combiner 84 may be a coupler, a multiplexer, or any other suitable device.

As described above, traffic destined for local clients of gateway 14 is dropped to distributing/combining element 80 using coupler 60. The drop traffic is received at splitter 82 of distributing/combining element 80, and splitter 82 splits the dropped signal into multiple generally identical signals and forwards each signal to an optical receiver 102 via a drop lead 86. In particular embodiments, the signal received by optical receivers 102 may first be filtered by an associated filter 100. Filters 100 may be implemented such that each filter allows a different channel to be forwarded to its associated receiver 102. Filters 100 may be tunable filters (such as an acousto-optic tunable filter) or other suitable filters, and receivers 102 may be broadband receivers or other suitable receivers. Such a configuration allows each receiver 102 associated with ring 16 to receive a different wavelength, and to forward the information transmitted in that wavelength to appropriate clients. A dropped optical signal passing through a filter 100 is able to be optically forwarded to a client without signal regeneration if the signal does not require such regeneration. Although FIG. 2A illustrates a particular embodiment of distributing/combining element 80 that includes a particular configuration of drop signal splitter 82, drop leads 86, and filters 100, in alternative embodiments of gateway 14 any or all of these components may be replaced by a suitable embodiment of WBU 54, including either of the embodiments illustrated by FIG. 2B or FIG. 2C.

As mentioned above, gateway 14 also provides an element management system. EMS 124 monitors and/or controls all elements in the gateway 14. In particular, EMS 124 receives an OSC signal from access ring 20 in an electrical format via an OSC receiver 112 associated with access ring 20 (the OSC receiver 112 obtains the signal via an OSC filter 66*a*). EMS 124 may process the signal, forward the signal and/or loopback the signal. Thus, for example, EMS 124 is operable to receive the electrical signal and resend the OSC signal via OSC transmitter 116 and OSC filter 66*b* to the next node on access ring 20, adding, if appropriate, node-specific error information or other suitable information to the OSC.

In one embodiment, each element in a gateway 14 monitors itself and generates an alarm signal to the EMS 124 when a failure or other problem occurs. For example, EMS 124 in gateway 14 may receive one or more of various kinds of alarms from the elements and components in the gateway 14: an amplifier loss-of-light (LOL) alarm, an amplifier equipment alarm, an optical receiver equipment alarm, optical transmitter equipment alarm, or other alarms. Some failures may produce multiple alarms. For example, a fiber cut may produce amplifier LOL alarms at adjacent nodes and also error alarms from the optical receivers. In addition, the EMS 124 may monitor the wavelength and/or power of the optical signal within the gateway 14 using an optical spectrum analyzer (OSA) communicably connected to appropriate fiber segments within gateway 14 and to EMS 124.

NMS 126 may collect error information from any or all of ADNs 12 and gateways 14 and may be operable to analyze the alarms and determine the type and/or location of a failure. Based on the failure type and/or location, NMS 126 determines needed protection switching actions for the network 10. The protection switch actions may be carried out by NMS 126 by issuing instructions to EMS 124 in ADNs 12 and gateways 14. Error messages may indicate equipment failures that may be rectified by replacing the failed equipment. For example, a failure of an optical receiver or transmitter may trigger an optical receiver equipment alarm or an optical transmitter equipment alarm, respectively, and the optical receiver or transmitter replaced as necessary.

FIG. 2B illustrates one embodiment of WBU 54. In particular, FIG. 2B illustrates an embodiment of WBU 54 that includes a series of switches 230 capable of selectively terminating or passing particular wavelengths of incoming traffic to WBU 54. In the illustrated embodiment, WBU 54 includes a demultiplexer 210, a multiplexer 220, and a plurality of switches 230.

In operation, demultiplexer 210 receives optical signals input to WBU 54, for example, from coupler 60*a* of gateway 14. Demultiplexer 210 demultiplexes the signal into its constituent channels. Switches 230 may be dynamically configured to selectively terminate or forward each channel to multiplexer 220 based on control signals received by each switch 230 on an associated control line 232. The channels that are forwarded by switches 230 are received by multiplexer 220, which multiplexes the received channels into a WDM optical signal and forwards the optical signal to downstream elements, such as local ring 30. Consequently, wavelengths may be selectively terminated or forwarded to terminate traffic not to be forwarded to components downstream from WBU 54. For example, switches 230 may be configured to terminate traffic on particular wavelengths reserved for use in a particular local ring 30 to which WBU 54 is coupled. As a result, ADNs 12 and other components located on local ring 30 may add traffic on one of these reserved wavelengths without interference from upstream traffic.

FIG. 2C illustrates an alternative embodiment of WBU 54 that utilizes one or more couplers 60 in place of demultiplexer 210 and multiplexer 220 and a collection of tunable filters 270 instead of switches 230. In particular, the illustrated embodiment of WBU 54 includes a first coupler 60*e*, a second coupler 60*f*, and a plurality of tunable filters 240. Each tunable filter 240 is tuned to propagate a particular wavelength, or range of wavelengths, of traffic and to terminate all other wavelengths or ranges of wavelengths.

In operation, coupler 60*e* receives optical signals input to WBU 54, for example, from coupler 60*a* of gateway 14. Coupler 60*e* splits the optical signals into a plurality of copies and transmits each of these copies to a particular tunable filter 270. Although couplers 60*e* and 60*f* are both shown as a single coupler, both coupler 60*e* and 60*f* may, in a particular embodiment of WBU 54 comprise one or more couplers cascaded to generate multiple copies of the optical signals input to WBU 54.

Each tunable filter 270 selectively passes traffic propagating at a particular wavelength or within a particular range of wavelengths and blocks traffic propagating at all other wavelengths. Each tunable filter 270 then forwards the passed traffic propagating at the associated wavelength or wavelengths to coupler 60*f*. Coupler 60*f* combines the output of each tunable filter 270 and forwards these signal to, for example, local ring 30 coupled to WBU 54. Consequently, only wavelengths matching the "tuning" of one or more filters 270 will pass through the series of filters 270 and wavelengths may be selectively terminated or forwarded to the local ring 30 associated with WBU 54.

FIG. 3 is a block diagram illustrating details of an alternative embodiment of gateway 14. In particular, FIG. 3 illustrates contents of a particular type of gateway 14, such as gateway 14*y*, capable of forwarding selected traffic on one or more local rings 30 to access ring 20. Referring to FIG. 3, the gateway 14 comprises one or more transport elements 50, a local traffic unit 90, and a managing element 110. Additionally, particular embodiments of gateway 14, such as the one illustrated in FIG. 3, are configured to facilitate direct communication between client devices and access ring 20 and may include a distributing/combining element 80 to support such operation. Transport element 50, managing element 110, and distributing/combining element 80 are similar in content and operation to that described above with respect to FIG. 2A.

As shown in FIG. 1A, gateway 14x is connected to an ingress end of one or more local rings 30, while another gateway 14, specifically gateway 14y, is connected an egress end of one or more of those local rings 30 upstream from gateway 14x. Thus, traffic broadcast to a particular local ring 30 by gateway 14x will be received by gateway 14y once that traffic traverses local ring 30. Although FIG. 3 illustrates a particular embodiment of gateway 14 that is configured only to receive broadcast traffic after such traffic has traversed local ring 30 and that is not responsible for receiving the broadcast traffic initially on access ring 20 and forwarding this traffic to local ring 30, a particular embodiment of gateway 14 may include components for both forwarding and receiving broadcast traffic but be configured only to perform only one of these tasks. Thus, a particular embodiment of gateway 14 similar to that illustrated in FIG. 4 may be configured to operate as described with respect to the embodiment of gateway 14 illustrated by FIG. 3. Conversely, under certain circumstances, gateways 14 configured similar to that shown in FIG. 3 may be modified with the addition of appropriate components to operate as described with respect to the embodiment of gateway 14 illustrated by FIG. 4.

Local traffic unit 90 receives traffic propagating on one or more local rings 30 coupled to gateway 14 and terminates or blocks whatever portion of this traffic represents broadcast traffic. Local traffic unit 90 may additionally receive local traffic propagating on local ring 20 and add this local traffic to traffic currently propagating on access ring 20. Local traffic unit 90 may terminate broadcast traffic based on any appropriate criteria associated with broadcast traffic transmitted on network 10. In a particular embodiment of network 10, broadcast traffic is transmitted on a designated wavelength or range of wavelengths. In such an embodiment of network 10, local traffic unit 90 may include a WBU 54c that blocks the wavelength or wavelengths designated for broadcast traffic. This may allow gateway 14 to add local traffic from local ring 30 to access ring 20 without also adding broadcast traffic that has propagated across local ring 30 that may interfere with broadcast traffic currently propagating on access ring 20.

Additionally, although FIG. 3 illustrates an embodiment of gateway 14 that includes separate local unit 90 and distributing/combining element 80, gateway 14 may instead be configured so that transmitter 104 associated with local clients are coupled to components of local unit 90 and local unit 90 may forward traffic received from these receivers 104 as appropriate. For example, in a particular embodiment WBU 54c may represent a wavelength-selective switch. In such an embodiment, an input port of the wavelength selective switch may be coupled to local ring 30 while one or more other input ports may be coupled to transmitters 104 associated with local clients. The wavelength-selective switch may be able to combine traffic from local ring 30 and the local clients as appropriate.

In operation, transport element 50 receives traffic from access ring 20. Transport element 50, managing element 110, and distributing/combining element 80 all function as described above with respect to FIG. 2A. Additionally, in this embodiment, local traffic unit 90 receives traffic originating from one or more local rings 30 coupled to gateway 14. Local traffic unit 90 may also receive and block or terminate broadcast traffic that was forwarded to the local ring 20 from access ring 30 to prevent interference between broadcast traffic received from local ring 30 and the same broadcast traffic currently propagating on access ring 20. As noted above, local traffic unit 90, in particular embodiments, includes WBU 54c which blocks broadcast traffic by blocking or terminating traffic on one or more wavelengths associated with broadcast traffic. Local traffic unit 90 then transmits traffic passed by WBU 54c, including local traffic to coupler 60b for transmission on access ring 20. In such embodiments, WBU 54c may comprise the demultiplexer/multiplexer structure illustrated in FIG. 2B, the tunable filter structure illustrated in FIG. 2C, a wavelength selective switch, or any other appropriate component or components capable of blocking or terminating selected wavelengths of optical traffic.

FIG. 4 is a block diagram illustrating another alternative embodiment of gateway 14. In particular, FIG. 4 illustrates contents of a particular type of gateway 14, such as gateway 14z, capable of both forwarding broadcast traffic from access ring 20 to one or more local rings 30 and also of adding local traffic transmitted on those local rings 30 to access ring 20. Gateway 14z includes transport element 50, managing element 110, distributing/combining element 80, broadcast unit 52, and local traffic unit 90. As shown in FIG. 1A, in such an embodiment, gateway 14z is connected to a first end of one or more local rings 30 and also a second end of those local rings 30. Thus, traffic broadcast to a particular local ring 30 by gateway 14z will return to gateway 14z once that traffic traverses local ring 30.

Transport element 50, managing element 110, and distributing/combining element 80 are similar in content and operation to that described above with respect to FIG. 2A. Additionally, broadcast unit 52 and local traffic unit 90 operate as described above with respect to FIGS. 2A and 3, respectively. Broadcast unit 52 is, however, coupled to a first end of a particular local ring 30, while local traffic unit 90 is coupled to a second end of the same local ring 30. As a result, this embodiment of gateway 14 both drops broadcast traffic to local ring 30 and adds local traffic from local ring 30 to access ring 20. Operation of such an embodiment of gateway 14 is illustrated in greater detail in FIG. 7.

Figure 5:
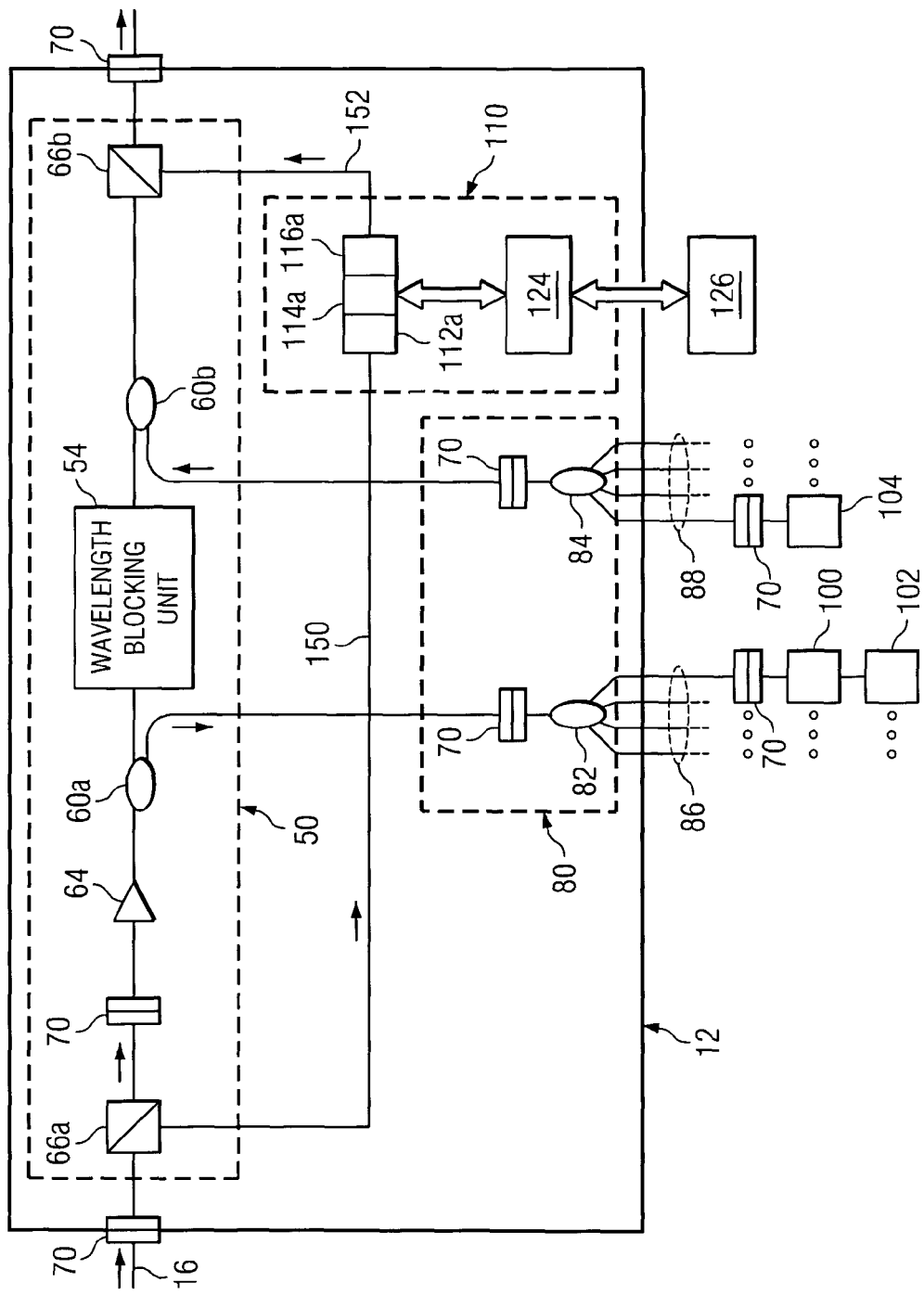
FIG. 5 is a block diagram illustrating a particular embodiment of an add/drop node that may be used in the network of FIGS. 1A and 1B.

FIG. 5 is a block diagram illustrating details of an ADN 12 in accordance with one embodiment of the present invention. Referring to FIG. 5A, the ADN 12 comprises transport element 50, distributing/combining element 80, and managing element 110. In one embodiment, the elements 50, 80, and 110, as well as components within the elements may be interconnected with optical fiber links. In other embodiments, the components may be implemented in part or otherwise with planar waveguide circuits and/or free space optics. Any other suitable connections may alternatively be used. In addition, the elements of ADN 12 may each be implemented as one or more discrete cards within a card shelf of the ADN 12. Exemplary connectors 70 for a card shelf embodiment are illustrated by FIG. 5. The connectors 70 may allow efficient and cost effective replacement of failed components. It will be understood that additional, different and/or other connectors may be provided as part of the ADN 12.

Transport element 50 passively adds traffic to access ring 20 or local ring 30 and passively drops traffic from local ring 30 to facilitate the exchange of information between client devices of ADN 12 and local ring 30. Distributing/combining element 80 converts electric signals received from client devices to optic signal for transmission on local ring 30 and converts optic signals received from local ring 30 to electric signals for transmission to client devices. Managing element 110 monitors operation of ADN 12 and other components of network 10 and may reconfigure ADN 12 to adjust to traffic interruptions or component failures. The contents and operation of transport element 50, distributing/combining element 80, and managing element 110 are similar to that described above with respect to FIG. 2A.

FIG. 6 illustrates further the operation of a gateway 14 as shown in FIG. 2A in conjunction with a gateway 14 as shown in FIG. 3 in broadcasting traffic from an access ring 20 to a local ring 30x. In particular, FIG. 6 illustrates a portion of network 10 that includes a first gateway 14x and a second gateway 14y that, respectively, drop traffic to local ring 30x from access ring 20 and add local traffic to access ring 20 from local ring 30x. The illustrated portion of network 10 also includes an ADN 12 capable of adding traffic to and dropping traffic from local ring 30 on behalf of client devices attached to ADN 12. As shown in FIG. 6, network 10 only supports propagation of traffic in a single direction, counterclockwise here. As noted above, however, the present invention also contemplates an embodiment of network 10 that supports bi-directional traffic with suitable modification to the appropriate components.

During operation, gateway 14x receives traffic 610 propagating on access ring 20. Traffic 610 may include a plurality of individual traffic streams propagating at different wavelengths. Gateway 14x splits traffic 610 into two copies. Gateway 14x also forwards a first copy 620 to the next downstream component on access ring 20, in this case gateway 14y. Additionally, gateway 14x forwards the traffic in particular wavelengths of the second copy of traffic 610 to local ring 30 as broadcast traffic 630. As discussed above, all traffic transmitted on access ring 20, or any appropriate portion of the traffic, may be broadcast on local ring 30.

If only a portion of traffic 610 is to be broadcast on local ring 30, gateway 14x may use any appropriate characteristic of the second copy of traffic 610 to determine what portion of that traffic represents broadcast traffic appropriate for transmission to local ring 30. In particular embodiments, particular wavelengths are designated for broadcast traffic with the designation being predetermined and fixed or dynamically determined during operation. In such embodiments, broadcast unit 52 blocks all wavelengths in the second copy of traffic 610 that are not associated with broadcast traffic and forwards the traffic in the remaining wavelengths to generate a broadcast traffic stream 630. Gateway 14x transmits this broadcast traffic stream 630 on local ring 30x.

ADN 12x receives and drops broadcast traffic stream 630. ADN 12x performs any appropriate optical-to-electrical conversion and/or switching to transmit particular portions of this traffic to client devices coupled to ADN 12x. In a particular embodiment, broadcast traffic stream 630 is transmitted to all client devices coupled to ADN 12x. ADN 12x also adds traffic generated by these client devices (local traffic stream 632) to local ring 30x. In particular embodiments that designate particular wavelengths for broadcast transmissions, local traffic stream 632 may be transmitted on one or more wavelengths not among those designated for broadcast traffic. Local traffic stream 632 and broadcast traffic stream 630 are propagated to the next downstream component on local ring 30, second gateway 14y. In alternative embodiments, local ring 30x may include multiple ADNs 12, one or none of which may add additional local traffic streams 632.

Gateway 14y receives all traffic transmitted on local ring 30x. Local traffic unit 90 of second gateway 14y allows local traffic stream 632 from local ring 30x to pass through local traffic unit 90, and local traffic stream 632 is added to traffic already propagating on access ring 20. Local traffic unit 90 however does not allow broadcast traffic stream 630 propagating on local ring 30 to pass through local traffic unit 90. Local traffic unit 90 instead terminates broadcast traffic stream 630. As indicated above, in particular embodiments, broadcast traffic is transmitted on one or more designated broadcast wavelengths and local traffic unit 90 of second gateway 14y may be configured to block all traffic streams on these designated broadcast wavelengths. As a result, local traffic streams 632 from local ring 30 are added to traffic streams propagating on access ring 20 while broadcast traffic streams 630 from local ring 30 are not. This, in turn, prevents interference that may result from broadcast traffic streams 630 being added to other broadcast traffic streams being transmitted on access ring 20 at the same wavelength as broadcast traffic stream 630.

FIG. 7 illustrates the operation of an embodiment of gateway 14 as shown in FIG. 4 in broadcasting traffic from access ring 20 to local ring 30z. In particular, FIG. 7 illustrates a portion of network 10 that includes a gateway 14z that both drops traffic to local ring 30z from access ring 20 and adds traffic to access ring 20 from that same local ring 30z. The illustrated portion of network 10 also includes ADN 12z capable of adding traffic to and dropping traffic from local ring 30z on behalf of client devices attached to ADN 12z. As shown in FIG. 6, network 10 only supports propagation of traffic in a single direction, counterclockwise here. As noted above, however, the present invention also contemplates an embodiment of network 10 that supports bi-directional traffic with suitable modification to the appropriate components.

During operation, gateway 14z receives traffic 710 propagating on access ring 20. Traffic 710 may include a plurality of individual traffic streams propagating at different wavelengths. Gateway 14z splits traffic 710 into two copies. Gateway 14z transmits the first copy to the next downstream component on access ring 20 (not shown). Additionally, gateway 14z forwards the traffic in particular wavelengths of the second copy of traffic 710 to local ring 30 as broadcast traffic 730. As discussed above, all traffic transmitted on access ring 20, or any appropriate portion of the traffic, may be broadcast on local ring 30z.

If only a portion of traffic 710 is to be broadcast on local ring 30z, gateway 14z may use any appropriate characteristic of the second copy of traffic 710 to determine what portion of that traffic represents broadcast traffic appropriate for transmission on local ring 30. In particular embodiments, particular wavelengths are designated for broadcast traffic with the designation being predetermined and fixed or dynamically determined during operation. In such embodiments, broadcast unit 52 blocks all wavelengths in the second copy of traffic 710 that are not associated with broadcast traffic and forwards the traffic in the remaining wavelengths to generate a broadcast traffic stream 730. Gateway 14z transmits this broadcast traffic stream 730 on local ring 30z.

ADN 12z receives and drops broadcast traffic stream 730. ADN 12z performs any appropriate optical-to-electrical conversion and/or switching to transmit particular portions of this traffic to client devices coupled to ADN 12z. In a particular embodiment, broadcast traffic stream 730 is transmitted to all client devices coupled to ADN 12z. ADN 12z also adds traffic generated by these client devices (local traffic stream 732) to local ring 30. Local traffic stream 732 and broadcast traffic stream 730 are propagated to the next downstream component on local ring 30, gateway 14z. In alternative embodiments, local ring 30z may include multiple ADNs 12, one or none of which may add additional local traffic streams 732.

Gateway 14z receives all traffic transmitted on local ring 30z. Local traffic unit 90 of gateway 14z allows local traffic 732 on local ring 30 to pass through local traffic unit 90, and this local traffic 732 is added to access ring 20. Local traffic unit 90, however, does not allow broadcast traffic 730 propagating on local ring 30z to pass through local traffic unit 90. Local traffic unit 90 instead terminates broadcast traffic 730. As indicated above, in particular embodiments, broadcast traffic is transmitted on one or more designated broadcast wavelengths and local traffic unit 90 may be configured to block all traffic streams on these designated broadcast wavelengths. As a result, local traffic streams 732 from local ring 30 are added to traffic streams propagating on access ring 20 while broadcast traffic streams 730 from local ring 30 are not. This, in turn, prevents interference that may result from broadcast traffic streams 730 being added to other broadcast traffic streams being transmitted on access ring 20 at the same wavelength as broadcast traffic stream 730.

Figure 8:
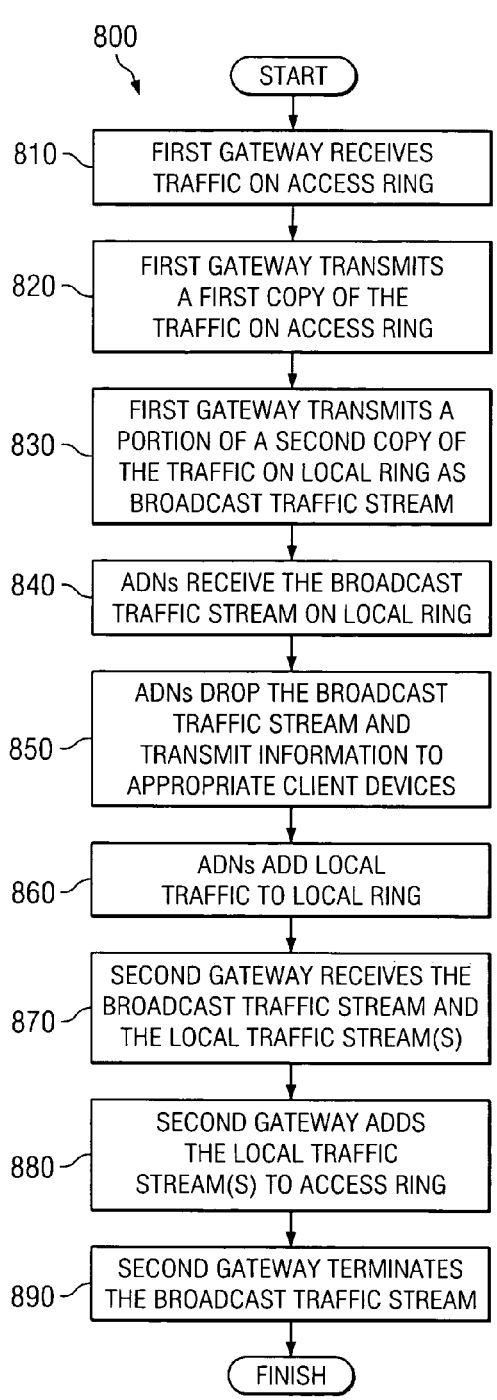
FIG. 8 is a flowchart describing an example operation of two embodiments of a gateway that may be utilized in the network of FIGS. 1A and 1B.

FIG. 8 is a flow chart illustrating operation according to a method 800 of particular embodiments of network 10 in which broadcast traffic is forwarded to local ring by a first gateway 14 and, after traversing local ring 30, terminated by a second gateway 14. Although this description may suggest a particular order for the following steps, a particular embodiment of network 10 may perform these steps in any appropriate order and multiple steps may be performed concurrently. Method 800 begins at step 810 as a first gateway 14 receives traffic propagating on access ring 20. The first gateway 14 transmits, on access ring 20, a first copy of the traffic received on access ring 20 at step 820. At step 830, the first gateway 14 transmits, on local ring 30, a portion of the second copy of the traffic (the portion that is broadcast traffic) as a broadcast traffic stream on the local ring 30 associated with the first gateway 14.

At step 840, one or more ADNs 12 on local ring 30 receive the broadcast traffic stream on local ring 30. The ADNs 12 drop the broadcast traffic stream 630 and transmit information in the broadcast traffic stream to appropriate client devices at step 850. At step 860, ADNs 12 potentially add local traffic that includes information transmitted by client devices to the traffic propagating on local ring 30.

At step 870, a second gateway 14 receives the broadcast traffic stream and the local traffic stream(s). The second gateway 14 adds the local traffic stream(s) to the traffic propagating on access ring 20 at step 880. At step 890, the second gateway 14 terminates the broadcast traffic stream by blocking traffic propagating on local ring 30 at one or more wavelengths associated with broadcast traffic.

Figure 9:
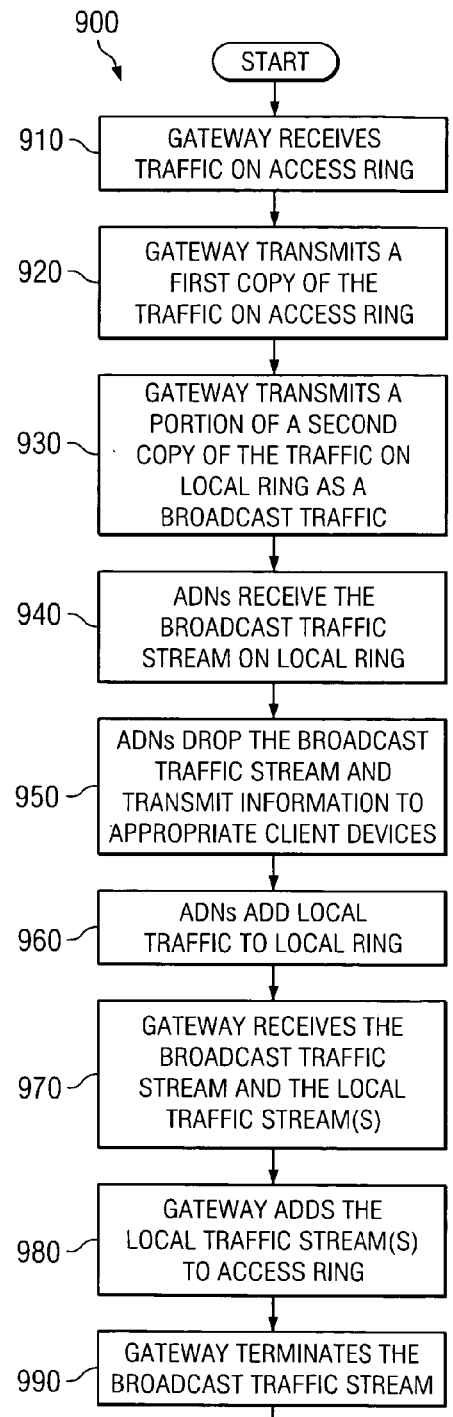
FIG. 9 is a flowchart describing an example operation of another embodiment of a gateway that may be utilized in the network of FIGS. 1A and 1B.

FIG. 9 is a flow chart illustrating operation according to a method 900 of particular embodiments of network 10 in which broadcast traffic is forwarded to local ring by a gateway 14 and, after traversing local ring 30, terminated by the same gateway 14. Although this description may suggest a particular order for the following steps, a particular embodiment of network 10 may perform these steps in any appropriate order and multiple steps may be performed concurrently. Method 900 begins at step 910 as gateway 14 receives traffic propagating on access ring 20. Gateway 14 transmits, on access ring 20, a first copy of the traffic received on access ring 30 at step 920. At step 930, gateway 14 transmits, on local ring 30, a portion of the second copy of the traffic (the portion that is broadcast traffic) as a broadcast traffic stream on the local ring 30 associated with gateway 14.

At step 940, one or more ADNs 12 receive the broadcast traffic stream on local ring 30. The ADNs 12 drop the broadcast traffic stream and transmit information in the broadcast traffic stream to appropriate client devices at step 950. At step 960, the ADNs 12 potentially add local traffic that includes information transmitted by client devices to the traffic propagating on local ring 30.

At step 970, gateway 14 receives the broadcast traffic stream and the local traffic stream(s). Gateway 14 adds the local traffic stream(s) to the traffic propagating on access ring 20 at step 980. At step 990, gateway 14 terminates the broadcast traffic stream by blocking traffic propagating on local ring 30 at one or more wavelengths associated with broadcast traffic.

Although the present invention has been described with several embodiments, various changes and modifications may be suggested to one skilled in the art. It is intended that the present invention encompass such changes and modifications as fall within the scope of the appended claims.

What is claimed is:

1. An optical network, comprising:
    an access ring coupling a plurality of gateways and operable to transmit optical signals to and from the gateways, the optical signals comprising multiple wavelengths, each wavelength operable to carry traffic;
    a local ring coupling one or more add/drop nodes (ADNs) and operable to transmit optical signals to and from the ADNs; and
    the one or more ADNs operable to add and drop traffic to and from the local ring in one or more wavelengths;
    a first gateway operable to:
        receive broadcast traffic on the access ring, the broadcast traffic transmitted in one or more wavelengths of the optical signals transmitted on the access ring;
        forward, on the access ring, a first copy of the broadcast traffic received on the access ring; and
        forward, to the local ring, a second copy of the broadcast traffic received on the access ring; and
    a second gateway operable to:
        receive local traffic originating from one or more of the ADNs on the local ring;
        forward the local traffic to the access ring;
        receive, from the local ring, broadcast traffic forwarded to the local ring by the first gateway; and
        terminate the broadcast traffic received from the local ring.

2. The optical network of claim 1, wherein the second gateway is further operable to forward the local traffic received on the local ring to the access ring by:
    adding the local traffic received on the local ring to the optical signals received on the access ring, the optical signals received on the access ring comprising traffic transmitted in different wavelengths from the local traffic; and
    forwarding the optical signals including the local traffic to another gateway on the access ring.

3. The optical network of claim 1, wherein the first gateway comprises:
    a first optical coupler coupled to the access ring and operable to:
        split an optical signal received on the access ring into a first copy of the optical signal and a second copy of the optical signal, wherein the optical signal comprises the broadcast traffic in one or more wavelengths of the optical signal; and
        forward the first copy of the optical signal on the access ring;
        forward the second copy of the optical signal to a wavelength blocker coupled to the local ring; and
    the wavelength blocker operable to:
        receive the second copy of the optical signal from the first optical coupler;
        terminate traffic in the second copy in one or more wavelengths not to be broadcast to the local ring; and forward traffic in one or more non-terminated wavelengths to the local ring.

4. The optical network of claim 3, wherein the second gateway comprises a second optical coupler coupled to the access ring and operable to add the local traffic received on the local ring to an optical signal received by the second coupler on the access ring.

5. The optical network of claim 3, wherein the wavelength blocker comprises:
an optical demultiplexer operable to demultiplex the second copy of the optical signal into a plurality of constituent wavelengths;
a plurality of optical switches, the plurality of optical switches operable to receive constituent wavelengths of the second copy and to selectively terminate particular constituent wavelengths; and
an optical multiplexer operable to combine one or more non-terminated constituent wavelengths output by the plurality of optical switches.

6. The optical network of claim 3, wherein the wavelength blocker comprises:
one or more input couplers operable to split the second copy of the optical signal into a plurality of copies of the optical signal;
a plurality of tunable filters, each of the plurality of tunable filters operable to receive one of the plurality of copies, to pass a particular constituent wavelength of the received copy, and to terminate other constituent wavelengths of the received copy; and
one or more output couplers operable to combine a plurality of optical signals output by the tunable filters.

7. The optical network of claim 3, wherein the wavelength blocker comprises a wavelength selective switch.

8. The optical network of claim 1, wherein the access ring comprises a first fiber and a second fiber and wherein the first gateway and the second gateway are further operable transmit optical signals on the first fiber in a first direction; and wherein the first gateway and the second gateway are operable to transmit optical signals on the second fiber in a second direction.

9. The optical network of claim 1, wherein at least one of the ADNs is operable to add traffic transmitted by and drop traffic transmitted to a client device coupled to that ADN.

10. The optical network of claim 1, wherein at least one of the gateways is operable to add traffic transmitted by and drop traffic transmitted to a client device coupled to that gateway.

11. An optical network, comprising:
an access ring coupling a plurality of gateways and operable to transmit optical signals to and from the gateways, the optical signals comprising multiple wavelengths, each wavelength operable to carry traffic;
a local ring coupling one or more add/drop nodes (ADNs) and operable to transmit optical signals between the ADNs; and
the one or more ADNs operable to add and drop traffic to and from the optical ring in one or more wavelengths; and
at least one gateway is operable to:
receive broadcast traffic on the access ring, the broadest traffic transmitted in one or more wavelengths of the optical signals transmitted on the access ring;
forward, on the access ring, a first copy of the broadcast traffic received on the access ring; and
forward, to the local ring, a second copy of the broadcast traffic received on the access ring; and
receive local traffic originating from one or more of the ADNs on the local ring;
forward the local traffic to the access ring;
receive, from the local ring, the broadcast traffic forwarded to the local ring by the at least one gateway; and
terminate the broadcast traffic received from the local ring.

12. The optical network of claim 11, wherein the at least one gateway is further operable to forward the local traffic received to the access ring by:
adding the local traffic received on the local ring to the optical signals received on the access ring, the optical signals received on the access ring comprising traffic transmitted in different wavelengths from the local traffic; and
forwarding the optical signals including the local traffic to the access ring.

13. The optical network of claim 11, wherein the at least one gateway comprises:
a first optical coupler coupled to the access ring and operable to:
split an optical signal received on the access ring into a first copy of the optical signal and a second copy of the optical signal, wherein the optical signal comprises the broadcast traffic in one or more wavelengths of the optical signal; and
forward the first copy of the optical signal on the access ring;
forward the second copy of the optical signal to a wavelength blocker coupled to the local ring and the wavelength blocker operable to:
receive the second copy of the optical signal from the first optical coupler;
terminate traffic in one or more wavelengths of the second copy that are not to be broadcast to the local ring; and
forward traffic in one or more non-terminated wavelengths to the local ring.

14. The optical network of claim 13, wherein the at least one gateway comprises a second optical coupler coupled to the access ring and operable to add the local traffic received on the local ring to an optical signal received by the second coupler from the wavelength blocker.

15. The optical network of claim 13, wherein the wavelength blocker comprises:
an optical demultiplexer operable to demultiplex the second copy of the optical signal into a plurality of constituent wavelengths;
a plurality of optical switches, the plurality of optical switches operable to receive constituent wavelengths of the second copy and to selectively terminate particular constituent wavelengths; and
an optical multiplexer operable to combine one or more non-terminated constituent wavelengths output by the plurality of optical switches.

16. The optical network of claim 13, wherein the wavelength blocker comprises:
one or more input couplers operable to split the second copy of the optical signal into a plurality of copies of the optical signal;
a plurality of tunable filters, each of the plurality of tunable filters operable to receive one of the plurality of copies, to pass a particular constituent wavelength of the received copy, and to terminate other constituent wavelengths of the received copy; and
one or more output couplers operable to combine a plurality of optical signals output by the tunable filters.

17. The optical network of claim 13, wherein the wavelength blocker comprises a wavelength selective switch.

18. The optical network of claim 11, wherein the access ring comprises a first fiber and a second fiber and wherein the at least one gateway is operable to transmit traffic on the first fiber in a first direction; and wherein the at least one gateway is operable to transmit traffic on the second fiber in a second direction.

19. The optical network of claim 11, wherein at least one of the ADNs is operable to add traffic transmitted by and drop traffic transmitted to a client device coupled to that local ADN.

20. The optical network of claim 11, wherein the at least one gateway is further operable to add traffic transmitted by and drop traffic transmitted to a client device coupled to that gateway.

21. A method for providing optical communication, comprising:
- receiving optical signals on an access ring, the optical signals comprising multiple wavelengths, each wavelength operable to carry traffic, wherein broadcast traffic is transmitted in one or more of the multiple wavelengths;
- forwarding, on the access ring, a first copy of broadcast traffic received on the access ring;
- forwarding, to a local ring, a second copy of the broadcast traffic received on the access ring;
- receiving local traffic originating from one or more add/drop nodes (ADNs) on the local ring;
- forwarding the local traffic to the access ring;
- receiving, from the local ring, the broadcast traffic forwarded to the local ring; and
- terminating the broadcast traffic received from the local ring.

22. The method of claim 21, wherein receiving optical signals on the access ring comprises receiving, on the access ring, optical signals at a first gateway; and wherein terminating the broadcast traffic comprises terminating, at a second gateway, the broadcast traffic received from the local ring.

23. The method of claim 21, wherein receiving optical signals on the access ring comprises receiving, at a gateway on the access ring, optical signals; and wherein terminating the broadcast traffic comprises terminating, at the gateway, the broadcast traffic received from the local ring.

24. The method of claim 21, wherein forwarding the local traffic received on the local ring comprises:
- adding the local traffic received on the access ring to the optical signals received on the access ring, the received optical signals comprising traffic transmitted in different wavelengths than the local traffic; and
- forwarding the optical signals including the local traffic to the access ring.

* * * * *